United States Patent
Jin et al.

(10) Patent No.: US 9,881,392 B2
(45) Date of Patent: Jan. 30, 2018

(54) MIPMAP GENERATION METHOD AND APPARATUS

(71) Applicant: SAMSUNG ELECTRONICS CO., LTD., Suwon-si (KR)

(72) Inventors: Seunghun Jin, Suwon-si (KR); Jeongae Park, Seoul (KR); Woong Seo, Hwaseong-si (KR); Soojung Ryu, Hwaseong-si (KR); Yeongon Cho, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/598,590

(22) Filed: Jan. 16, 2015

(65) Prior Publication Data

US 2016/0005191 A1    Jan. 7, 2016

(30) Foreign Application Priority Data

Jul. 2, 2014  (KR) .................... 10-2014-0082528

(51) Int. Cl.
    *G06T 15/00*    (2011.01)
    *G06T 11/00*    (2006.01)
    *G06T 15/04*    (2011.01)

(52) U.S. Cl.
    CPC ............ *G06T 11/001* (2013.01); *G06T 15/04* (2013.01)

(58) Field of Classification Search
None
See application file for complete search history.

(56) References Cited

U.S. PATENT DOCUMENTS

| | | | | |
|---|---|---|---|---|
| 5,973,701 A | * | 10/1999 | Vaswani | G06T 15/10 345/587 |
| 6,184,888 B1 | | 2/2001 | Yuasa et al. | |
| 6,219,064 B1 | | 4/2001 | Kamen et al. | |
| 6,452,603 B1 | * | 9/2002 | Dignam | G06T 15/04 345/428 |
| 6,924,814 B1 | * | 8/2005 | Ephanov | G06T 15/04 345/582 |
| 8,487,948 B2 | | 7/2013 | Kai et al. | |
| 2008/0273042 A1 | * | 11/2008 | Cai | G06T 15/04 345/582 |
| 2010/0091028 A1 | * | 4/2010 | Grossman | G06T 15/04 345/587 |

(Continued)

FOREIGN PATENT DOCUMENTS

| | | |
|---|---|---|
| JP | 3645024 B2 | 5/2005 |
| KR | 10-0258883 B1 | 6/2000 |

(Continued)

*Primary Examiner* — Martin Mushambo
(74) *Attorney, Agent, or Firm* — F. Chau & Associates, LLC

(57) ABSTRACT

A method and corresponding apparatus are configured to generate a mipmap are configured to allocate a mipmap status register of a mipmap level generated with respect to a texture, receive a request for the texture, and calculate a mipmap level with respect to the texture. The method and corresponding apparatus are also configured to determine whether a mipmap of the calculated mipmap level exists using the mipmap status register and outputting a result indicative thereof, and determine whether to generate the mipmap of the mipmap level based on the result.

19 Claims, 11 Drawing Sheets

(56) References Cited

U.S. PATENT DOCUMENTS

| | | | | |
|---|---|---|---|---|
| 2012/0038657 | A1* | 2/2012 | Grossman | G06T 15/04 |
| | | | | 345/585 |
| 2013/0278601 | A1 | 10/2013 | Chen et al. | |
| 2013/0321443 | A1* | 12/2013 | Pahwa | G06T 15/04 |
| | | | | 345/587 |

FOREIGN PATENT DOCUMENTS

| | | | |
|---|---|---|---|
| KR | 10-0633029 | B1 | 10/2006 |
| KR | 10-1345379 | B1 | 1/2014 |

\* cited by examiner

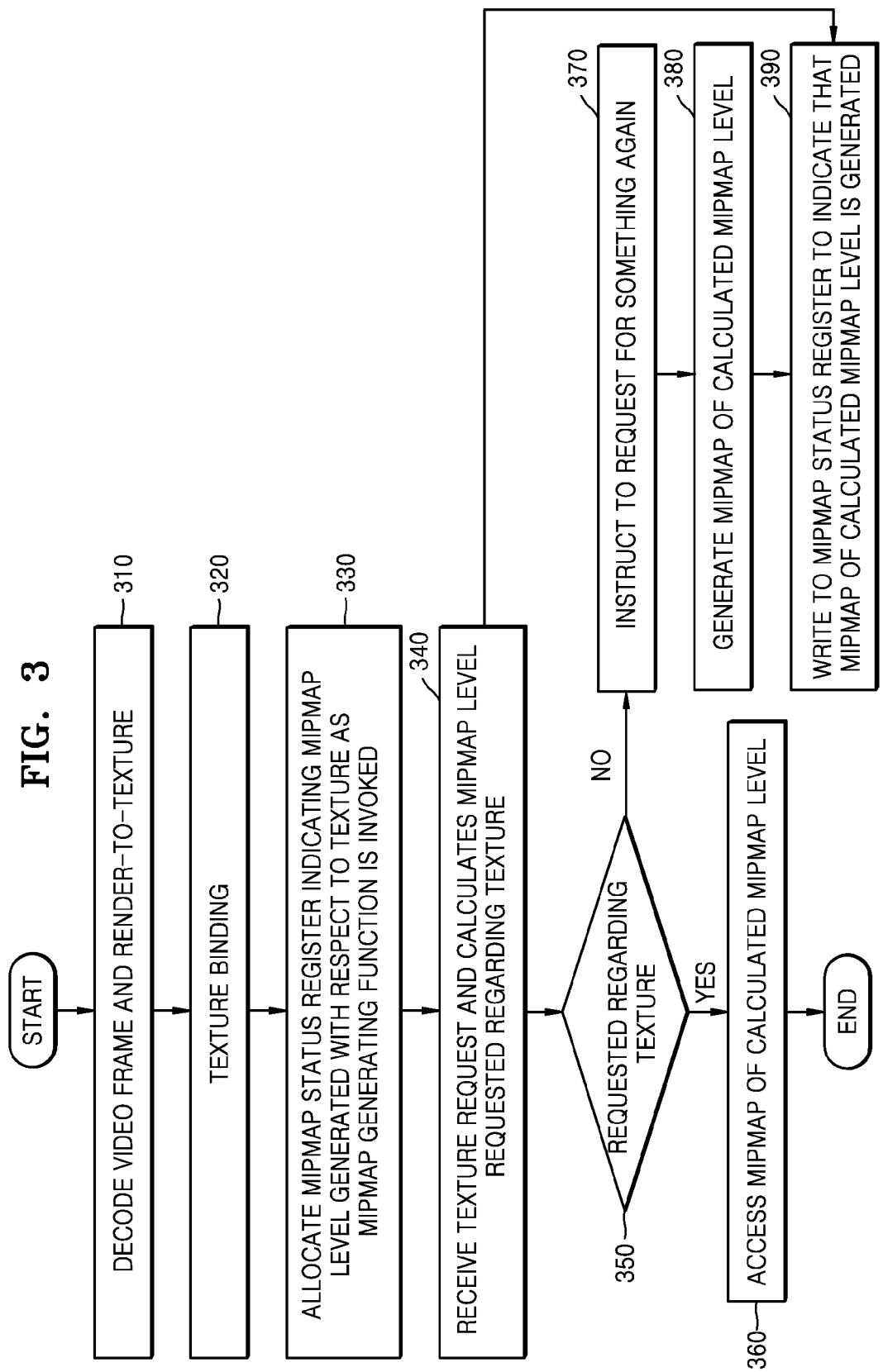

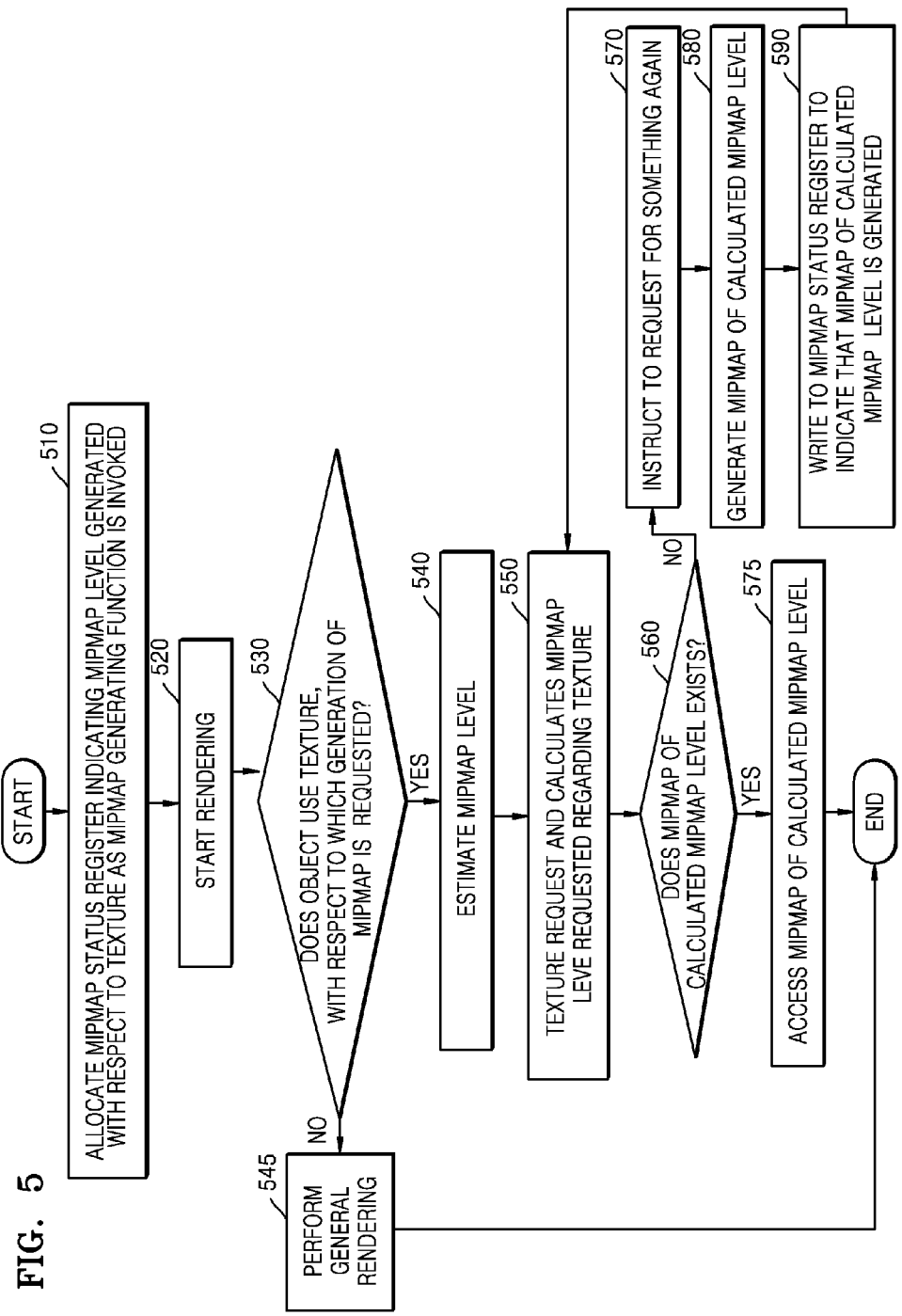

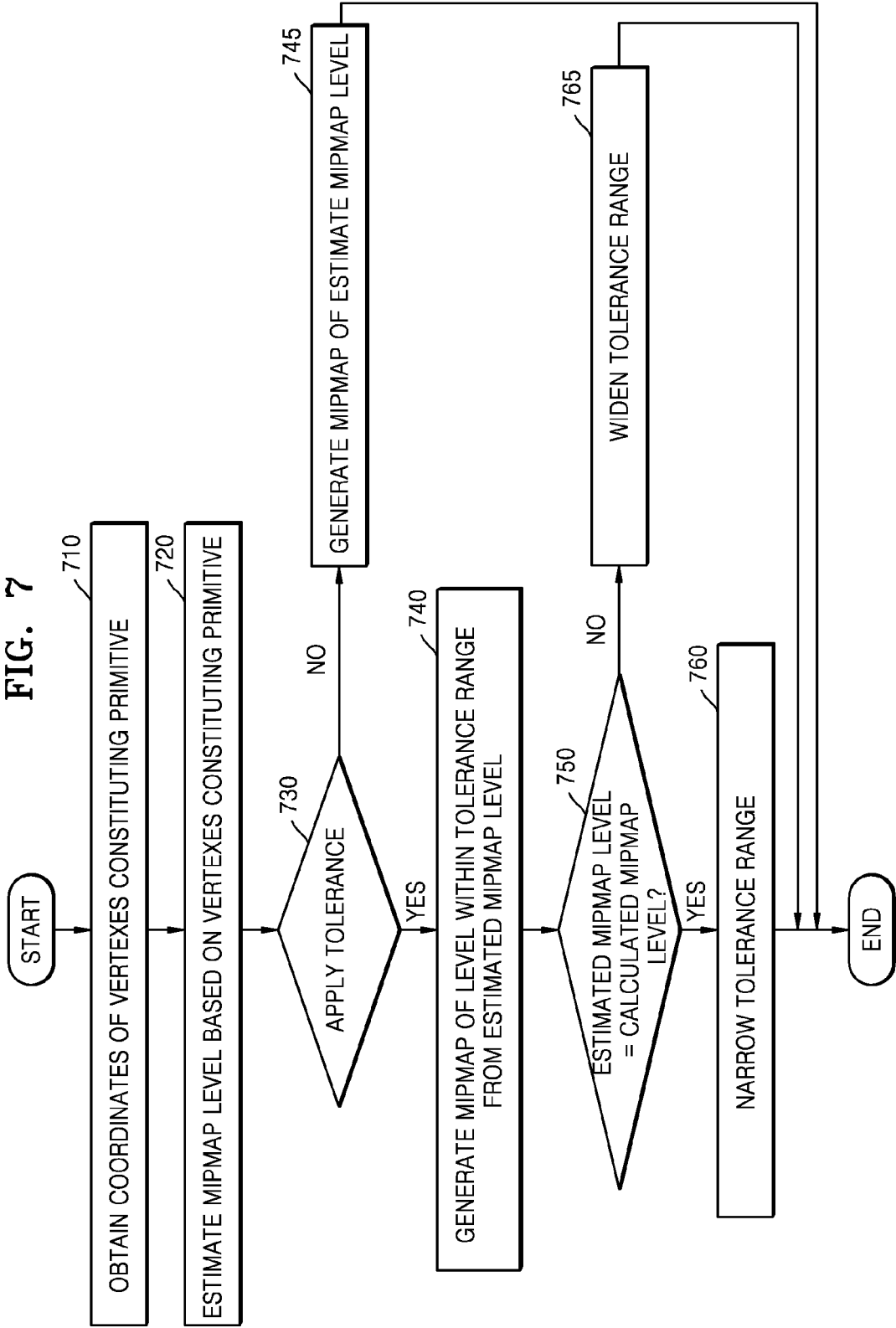

MIPMAP GENERATION METHOD AND APPARATUS

CROSS-REFERENCE TO RELATED APPLICATION(S)

This application claims the benefit under 35 U.S.C. § 119(a) of Korean Patent Application No. 10-2014-0082528, filed on Jul. 2, 2014, in the Korean Intellectual Property Office, the disclosure of which is incorporated herein in its entirety by reference.

BACKGROUND

1. Field

The following description relates to a method and apparatus for generating a mipmap.

2. Description of Related Art

Texture mapping is a technique used in the computer graphics field for illustrating detailed texture or painting a color on a surface of a virtual 3-dimensional (3D) object. The term "texture" refers to an image attached to a surface of an object during texture mapping. Generally, a 2-dimensional (2D) texture, which is a 2D still image, is used in texture mapping. In texture mapping a technique called mipmapping is utilized to improve a rendering speed and anti-aliasing.

In terms of texture-mapping 3D graphics, a mipmap is a group of bitmap images including a basic texture and textures generated by successively reducing the basic texture in advance to improve a rendering speed. If a mipmap is used, a texture is used in consideration of the size of an object to which the texture is to be attached in a final result. If a texture is an image formed in advance, images of various sizes used as a mipmap may be generally calculated off-line and may be used immediately during a rendering process.

In particular cases, textures prepared in advance may not be used. Render-to-texture is a technique to perform rendering on a texture instead of a screen image while rendering a special effect, such as a surface dynamically reflecting a screen image, generating a texture during execution of a program, and using the generated texture to render another scene. Furthermore, moving pictures are used as a texture in lieu of a still image. For example, to render a TV in virtual space, it is difficult to model an image displayed on a screen of the TV. Therefore, each frame of moving pictures may be used as a texture in a modeled screen image to obtain a same effect as the TV displaying the moving pictures. The technique is referred to as a texture streaming or (dynamic) video texture.

In video texture, a 2D texture to be used for a scene currently being rendered is obtained by calculating a required video frame and decompressing a corresponding frame. Furthermore, in the case of render-to-texture, a texture to be used is generated only after a scene is rendered. The obtained texture is a basic-sized texture, not a mipmap. Therefore, the obtained texture may be used like a general texture, only after generation of a mipmap. In the case of generating a mipmap with respect to each frame during the execution of an application program, the application program may be slowed down, unlike the texture of a general image that may be generated off-line.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration there is provided a method of generating a mipmap, including allocating a mipmap status register of a mipmap level generated with respect to a texture; receiving a request for the texture and calculating a mipmap level with respect to the texture; determining whether a mipmap of the calculated mipmap level exists using the mipmap status register and outputting a result indicative thereof; and determining whether to generate the mipmap of the mipmap level based on the result.

The determining of whether the mipmap of the calculated mipmap level exists may include in response to determining that the mipmap of the calculated mipmap level exists, determining not to generate a mipmap of the calculated mipmap level, and accessing the existing mipmap of the calculated mipmap level.

The determining of whether the mipmap of the calculated mipmap level exists may include in response to determining that the mipmap of the calculated mipmap level does not exist, generating a mipmap of the calculated mipmap level, and writing to the mipmap status register to indicate that the mipmap of the mipmap level is generated.

The generating of the mipmap of the calculated mipmap level may include instructing to request the texture again, and processing another texture request when the texture request is made again.

The allocating of the mipmap status register may include allocating the mipmap estimation register to estimate and write a requested mipmap level for the texture, estimating the mipmap level, writing the estimated mipmap level to the mipmap estimation register, generating the mipmap of the estimated mipmap level, and writing to the mipmap status register to indicate that the mipmap of the mipmap level is generated.

The determining of whether the mipmap of the calculated mipmap level exists may include in response to determining that the mipmap of the calculated mipmap level exists, determining not to generate the mipmap of the calculated mipmap level, and accessing the mipmap of the calculated mipmap level.

The determining of whether the mipmap of the calculated mipmap level exists may include in response to determining that the mipmap of the calculated mipmap level does not exist, generating the mipmap of the calculated mipmap level, and writing to the mipmap status register to indicate that the mipmap of the mipmap level is generated.

The determining to generate a mipmap of the calculated mipmap level may include instructing to request the texture again, and processing another texture request when the texture request is made again.

The allocating of the mipmap status register may further include allocating a mipmap request register to write an actually requested mipmap level with respect to the texture, wherein the writing of the estimated mipmap level to the mipmap estimation register may include writing mipmap levels within a tolerance range of the estimated mipmap level to the mipmap estimation register, wherein the generating of the mipmap of the estimated mipmap level is performed within the tolerance range of the estimated mipmap level, wherein the writing of the mipmap status register to indicate that the mipmap of the mipmap level is generated may include writing the mipmap status register to indicate that mipmaps of the mipmap levels within the tolerance range from the estimated mipmap level are generated, and wherein the calculating the mipmap level may further includes writing the calculated mipmap level to the mipmap request register.

The estimating of the mipmap level may include estimating the mipmap level based on vertexes may include a primitive to use the texture.

The estimating of the mipmap level may include obtaining coordinates of vertexes may include the primitive, calculating a size of the primitive and a slope on a Z-plane of the primitive based on the coordinates of the vertexes, and estimating the mipmap level based on the size of the primitive, the slope on the Z-plane of the primitive, coordinates of the texture, and the size of the texture.

The tolerance may be adjusted based on whether the estimated mipmap level is identical to the calculated mipmap level.

The method may also include determining whether the estimated mipmap level is identical to the calculated mipmap level using the mipmap estimation register and the mipmap request register; and reducing the tolerance in response to determining that the estimated mipmap level is identical to the calculated mipmap level.

The method may also include determining whether the estimated mipmap level is identical to the calculated mipmap level using the mipmap estimation register and the mipmap request register; and increasing the tolerance in response to determining that the estimated mipmap level is not identical to the calculated mipmap level.

In accordance with an illustrative configuration there is provided a computer program embodied on a non-transitory computer readable medium, the computer program being configured to control a processor to perform allocating a mipmap status register of a mipmap level generated with respect to a texture; receiving a request for the texture and calculating a mipmap level with respect to the texture; determining whether a mipmap of the mipmap level exists using the mipmap status register and outputting a result indicative thereof; and determining whether to generate the mipmap of the mipmap level based on the result.

In accordance with an illustrative configuration there is provided a mipmap generating device, including a register allocating unit configured to allocate a mipmap status register indicating a mipmap level generated with respect to a texture; a mipmap level calculating unit configured to receive a request regarding the texture and calculates a mipmap level requested with respect to the texture; and a control unit configured to determine whether a mipmap of the calculated mipmap level exists using the mipmap status register and determine whether to generate a mipmap of the mipmap level based on whether the mipmap of the mipmap level exists.

In response to determining that a mipmap of the calculated mipmap level exists, the control unit may determine not to generate a mipmap of the calculated mipmap level and accesses the existing mipmap of the calculated mipmap level.

In response to determining that a mipmap of the calculated mipmap level does not exist, the control unit may generate a mipmap of the calculated mipmap level and writes to the mipmap status register to indicate that the mipmap of the mipmap level is generated.

The register allocating unit may allocate a mipmap estimation register to estimate and write a requested mipmap level for the texture, and the control unit may estimate the mipmap level, writes the estimated mipmap level to the mipmap estimation register, generates the mipmap of the estimated mipmap level, and writes to the mipmap status register to indicate that the mipmap of the mipmap level is generated.

The register allocating unit may allocate a mipmap request register to write the requested mipmap level with respect to the texture, and the control unit may write mipmap levels within a tolerance range from the estimated mipmap level in the mipmap estimation register, may generate mipmap of the mipmap levels within the tolerance range from the estimated mipmap level, may write to the mipmap status register to indicate that mipmaps of the mipmap levels within the tolerance range from the estimated mipmap level are generated, and may write the calculated mipmap level to the mipmap request register.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIG. 3 is a flowchart of a method of generating the delayed mipmap, according to an embodiment;

FIG. 5 is a flowchart of a method to generate a mipmap by estimating a mipmap level, according to another embodiment;

FIG. 7 is a flowchart of a method of estimating a mipmap level, according to another embodiment;

Figure 1A:
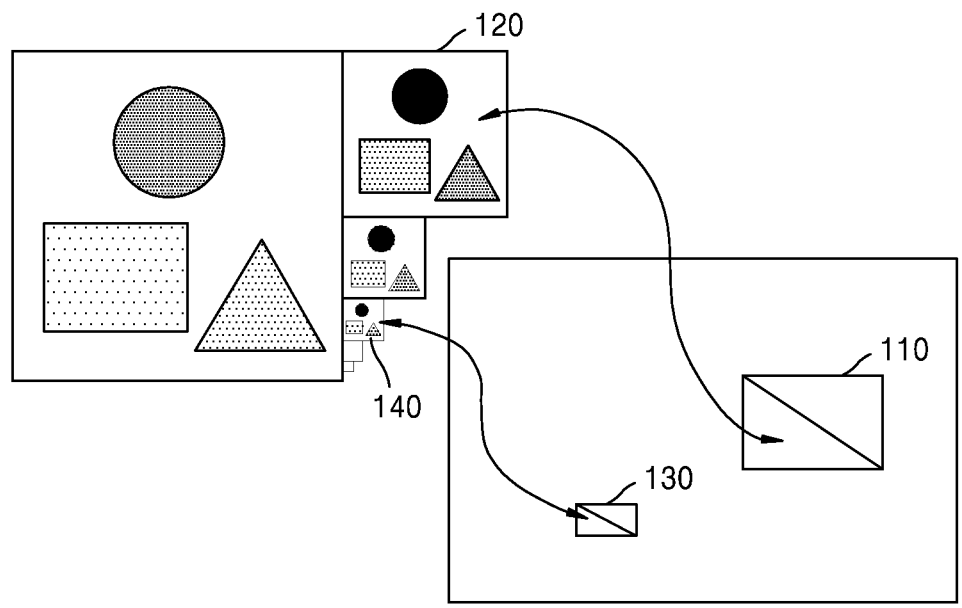
FIG. 1A and FIG. 1B are diagrams showing an example of using a mipmap and generation of a delayed mipmap, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. These terms do not necessarily imply a specific order or arrangement of the elements, components, regions, layers and/or sections.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

When a component is referred to as being "connected to" another component, it can not only be "directly connected," but also "electrically connected" across an intervening device. Furthermore, when a unit is referred to as "comprising" or "including" a component(s), it does not exclude other components unless stated otherwise and shall be referred to as comprising or including the other components.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Like reference numerals denote like elements.

Figure 1B:
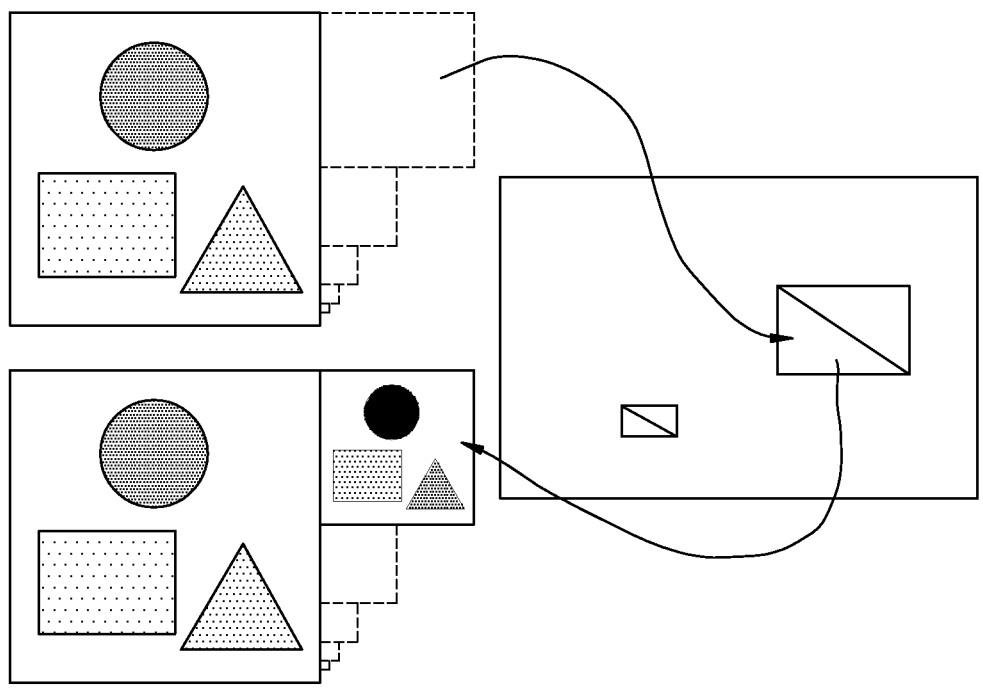

FIG. 1A and FIG. 1B are diagrams showing examples of using a mipmap and generation of a delayed mipmap, according to an embodiment.

FIG. 1A is a diagram describing a general mipmap set and mapping of a mipmap.

A mipmap includes a plurality of images generated by reducing a single image. A mipmap usually has from 6 to 8 levels, where the lowest level indicates an original image with high complexity, and higher levels indicate images with lower complexity. As mipmap level increases, each of the width and height of an image are usually reduced by $2^{Level\ of\ Detail}$, two raised to the power of a mipmap level. Generally, an image is reduced in the x-axis direction and the y-axis direction simultaneously. However, in particular cases, different reduction ratios may be respectively applied in the x-axis direction and the y-axis direction, thereby increasing the quality of a final image. The mipmap level of a mipmap to be used is obtained via a calculation. If an object is displayed large in a screen image 110, a low mipmap level 120 is selected. If an object using the same texture is displayed small in a screen image 130, a high mipmap level 140 is selected.

Generally, when a 2D image to be used as a texture is generated, operations performed include texture binding, allocation of memory space for storing a mipmap, generation of a mipmap, and usage of the mipmap.

FIG. 1B is a diagram showing generation and usage of a delayed mipmap, according to an embodiment.

According to an embodiment, generation of a mipmap may be delayed to a time when the mipmap is used, not a time for invoking a function. In other words, when a function for generating a mipmap regarding a 2D image to be used as a texture is invoked, a mipmap generating device writes the event, returns the function, and generates a mipmap at a requested mipmap level in response to an actual texture request is made. In this example, only a mipmap corresponding to a correct mipmap level is generated.

According to another embodiment, a mipmap generating unit estimates a mipmap level at a time at which screen image coordinates are acquired via a setup of primitives and generates a mipmap of the estimated mipmap level. In this case, a mipmap is generated during a time period between the reception of a draw call and performance of pixel shading with respect to the respective primitives. As a result, a time period for generating a mipmap may be hidden. A primitive refers to an element such as a line, a circle, a curved line, or a polygon that may be drawn as an individual object, stored, and manipulated by a graphics program for creating a graphic design using computer graphics. In one illustrative example, primitives may not have complicated shapes. Furthermore, pixel shading refers to a function for softening respective pixels during a rendering process.

The embodiments may be applied to a very large scale integration (VLSI), a graphics processing unit (GPU), or an application processor (AP). However, the embodiments are not limited thereto.

Figure 2:
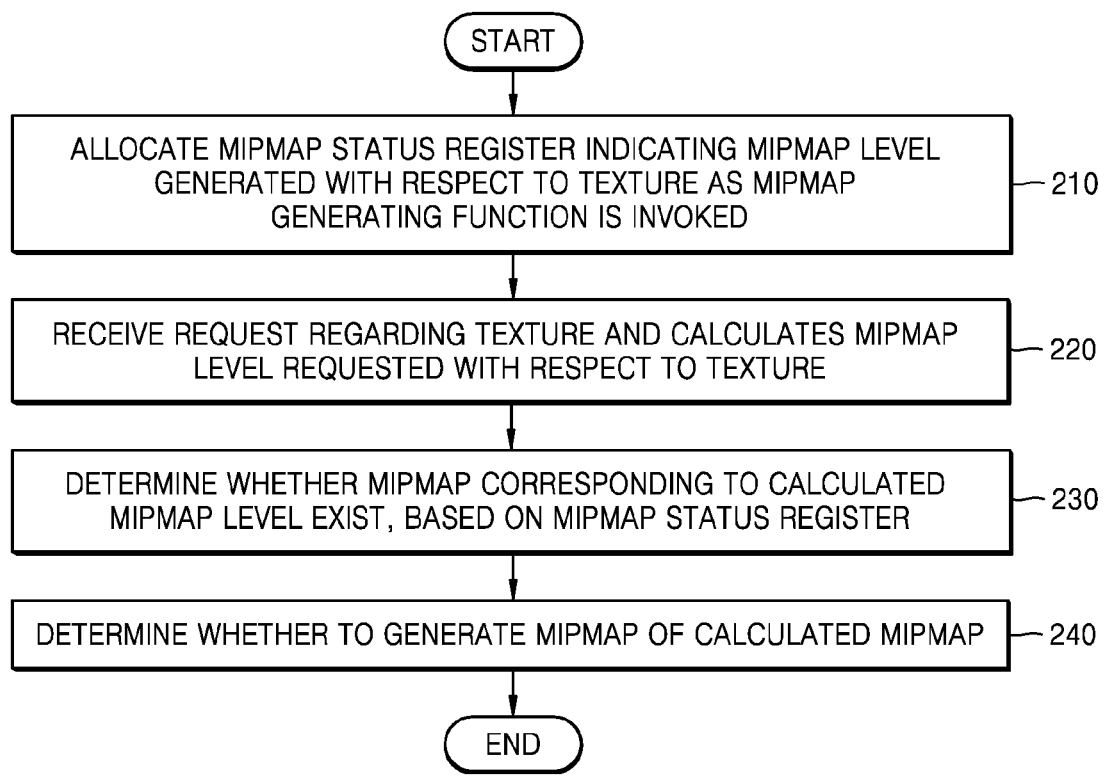
FIG. 2 is a flowchart of a method of generating the mipmap, according to an embodiment.

FIG. 2 is a flowchart of a method of generating the mipmap, according to an embodiment.

In operation 210, the method allocates, using a mipmap generating unit, a mipmap status register indicating a mipmap level generated with respect to a texture in response to a mipmap generating function being invoked.

According to an embodiment, the method allocates a mipmap status register for each texture in a frame. A mipmap status register may include a bit vector, which is a group of bits indicating respective mipmap levels thereof. A mipmap status register indicates whether a mipmap of a mipmap of the mipmap level exists.

According to another embodiment, the method, using the mipmap generating unit, further allocates slots for a mipmap estimation register to store an estimated mipmap level and a mipmap request register to store an actually requested mipmap level. The method of the mipmap generating unit estimates a mipmap level and generates a mipmap of the estimated mipmap level. Furthermore, the method of the mipmap generating unit writes to a mipmap status register to indicate a generated mipmap level.

The method of the mipmap generating unit, according to an embodiment, sets the initial value for the initial mipmap status register to indicate that an original texture (level 0) exists.

In operation 220, the method of the mipmap generating unit receives a request for a texture and calculates a mipmap level requested with respect to the texture.

The method of the mipmap generating unit, according to an embodiment, generates a mipmap level regarding a texture to be used for an object corresponding to the texture. The method of the mipmap generating unit calculates a mipmap level to be referred to or used by an address generating unit according to a texture request generated during pixel shading. The method performs the calculation of a mipmap level at a host processor or separate hardware. However, the embodiment is not limited thereto.

In operation 230, based on a mipmap status register, the method of the mipmap generating unit determines whether a mipmap corresponding to the calculated mipmap level exists and outputs a result indicative thereof.

A method of determining whether a mipmap corresponding to a calculated mipmap level exists based on a mipmap status register will be described below with reference to FIG. 4A and FIG. 4B.

In operation 240, the method of the mipmap generating unit determines whether to generate a mipmap of the calculated mipmap based on the result of the determining in operation 230.

If it is determined that there is a mipmap of the calculated mipmap level, the method of the mipmap generating unit determines not to generate a mipmap of the calculated mipmap level. The method of the mipmap generating unit accesses the mipmap of the calculated mipmap level. The mipmap generating unit performs texture mapping using the accessed mipmap.

For example, if a mipmap the texture is already generated by another primitive, the method of the mipmap generating unit accesses a mipmap of a necessary mipmap level and uses the mipmap for texture mapping without generating once again a mipmap.

Otherwise, if it is determined that there is no mipmap of the calculated mipmap level, the method of the mipmap generating unit generates a mipmap of the calculated mipmap level. The method of the mipmap generating unit generates the mipmap of the calculated mipmap level. The method of the mipmap generating unit writes to a mipmap status register to indicate that the mipmap of the calculated mipmap level is generated.

Alternatively, if it is determined that there is no mipmap of the calculated mipmap level, the method of the mipmap generating unit instructs to request for a texture once again. While a mipmap of the calculated mipmap level is being generated, the method of the mipmap generating unit processes another texture request until the previous texture request is reattempted.

According to an embodiment, the above-described operations 220 through 240 are repeatedly performed with respect to a texture request, before a mipmap corresponding a texture is prepared. Another texture request may be processed as soon as a corresponding mipmap is prepared, regardless of a texture currently being processed.

FIG. 3 is a flowchart of a method of generating the delayed mipmap, according to an embodiment.

Descriptions already given above with reference to FIG. 2 will be omitted.

In operation 310, the method of the mipmap generating unit decodes a video frame and generates a texture by applying the render-to-texture technique.

In operation 320, the method of the mipmap generating unit performs texture binding using the generated texture.

In operation 330, the method of the mipmap generating unit allocates a mipmap status register indicating mipmap level generated with respect to the texture as a mipmap generating function is invoked.

According to an embodiment, the method of the mipmap generating unit allocates memory space regardless of a texture mipmap generating call and returns the call without generating a mipmap.

In operation 340, the method of the mipmap generating unit receives a texture request and calculates a mipmap level requested regarding the texture.

According to an embodiment, if an actual texture request is generated during pixel shading, the method of the mipmap generating unit generates the level of a mipmap to be referred to or used by an address generating unit based on the texture request generated during the pixel shading.

When an actual request is generated regarding a corresponding texture via a graphics pipeline, the method of the mipmap generating unit receives a calculated mipmap level with reference to a texture address. In one illustrative example, the graphics pipeline refers to a multistage method for expressing a 3D image as a 2D raster image. Most graphic cards are capable of dividing a graphic process into sub-processes including 3D projection, window clipping, shading, and rendering, for example, where the sub-processes may be performed in parallel by their respective sub-modules.

In operation 350, the method of the mipmap generating unit determines whether a mipmap of the calculated mipmap level exists based on the mipmap status register.

If the method determines that a mipmap of the calculated mipmap level exists, the method proceeds to operation 360. Otherwise, if the method determines that a mipmap of the calculated mipmap level does not exist, the method proceeds to operation 370.

In operation 360, in response to determining that a mipmap of the calculated mipmap level exists, the method of the mipmap generating unit accesses the mipmap of the calculated mipmap level.

In response to determining that the mipmap of the calculated mipmap level exists, the method the mipmap generating unit determines not to generate a mipmap of the calculated mipmap level.

The method of the mipmap generating unit uses the accessed mipmap for texture mapping regarding an object corresponding to the texture.

For example, if there is only an original texture (level 0) at the initial state and a calculated mipmap level is 0, the method of the mipmap generating unit determines that a mipmap of the calculated mipmap level exists. Furthermore, the method of the mipmap generating unit performs texture mapping by using the original texture.

As another example, when a calculated mipmap level is not 0 and a mipmap of the calculated mipmap level is already generated as the previously requested texture, the method of the mipmap generating unit determines that a mipmap of the calculated mipmap level exists.

In operation 370, in response to the method determining that a mipmap of the calculated mipmap level does not exist, the method of the mipmap generating unit instructs to request the texture again.

For example, if a corresponding texture is requested for the first time, only an original texture (level 0) exists. Therefore, if a calculated mipmap level is not 0, the method of the mipmap generating unit determines that a mipmap of the calculated mipmap level does not exist.

In response to determining that a mipmap of the calculated mipmap level does not exist, the method of the mipmap generating unit determines to generate a mipmap of the calculated mipmap level.

In operation 380, the method of the mipmap generating unit generates a mipmap of the calculated mipmap level.

According to an embodiment, generation of a mipmap is not performed when a function is invoked, but is delayed to a time after a texture is requested. As a result, the method of the mipmap generating unit only generates a mipmap of a mipmap level that is actually used. Therefore, the mipmap generating unit and method thereof are configured to avoid generation of mipmaps of unnecessary mipmap levels.

In operation 390, the method of the mipmap generating unit writes to a mipmap status register to indicate that a mipmap of the calculated mipmap level is generated.

The mipmap generating unit and method thereof, according to an embodiment, writes generation of a mipmap at a bit vector of a mipmap status register, corresponding to a mipmap level of the generated mipmap.

Furthermore, after a designated time period passes, the mipmap generating unit may receive a texture request again. In other words, operation 340 may be performed again. The method of the mipmap generating unit determines whether a mipmap of a mipmap level calculated with respect to a texture exists by using a mipmap status register. If the method determines that a mipmap of the calculated mipmap level exists, operation 360 is performed and the mipmap generating unit accesses the mipmap of the calculated mipmap level.

According to an embodiment, if only an original texture (level 0) is used or a corresponding texture is not used at all, generation of a mipmap is omitted. Therefore, a load for generating a mipmap during execution of a program may be eliminated.

Furthermore, for example, if only textures of level 1 from among 8 mipmap levels are used, mipmap generating unit and method thereof generate only a mipmap of level 1, thereby saving time and computing resources for generating mipmaps of levels 2 through 8.

Figure 4A:
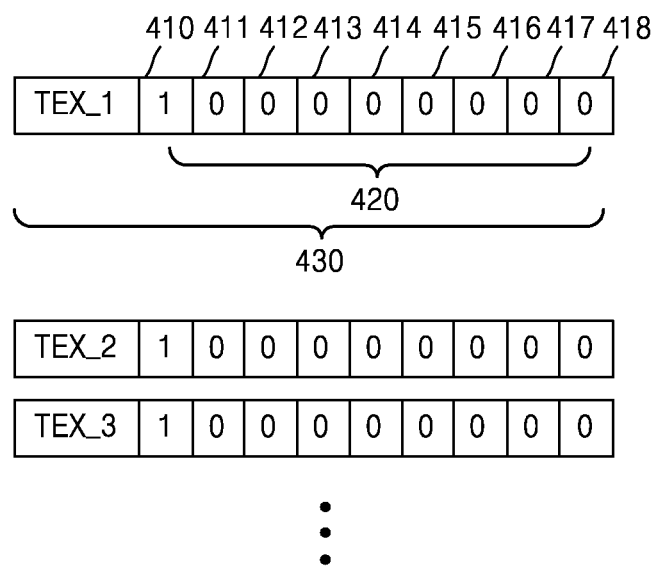
FIGS. 4A and 4B are diagrams showing an example of a mipmap status register used in the method described with reference to FIG. 3, according to an embodiment.
Figure 4B:
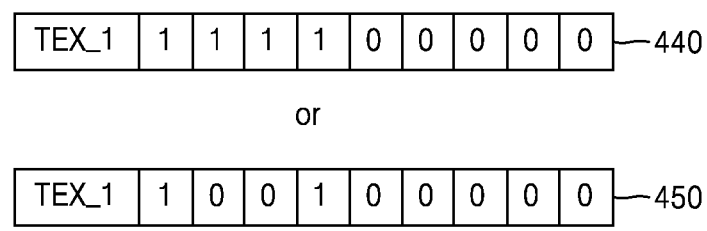

FIG. 4A and FIG. 4B are diagrams showing an example of a mipmap status register used in the method described with reference to FIG. 3, in accordance with an embodiment.

FIG. 4A shows an initially allocated mipmap status register, in accordance with an embodiment.

According to an embodiment, a mipmap generating unit allocates a mipmap status register with respect to each of the textures in a frame. In other words, the mipmap generating unit allocates a slot 430 of memory space to write a mipmap status with respect to each of the textures. Referring to FIG. 4A, mipmap status registers are respectively allocated with respect to a first texture, a second texture, a third texture, and so on.

A mipmap status register includes a bit vector 420, which is a group of bits, for example, first through ninth bits 410 through 418, indicating their respective mipmap levels, based on an embodied mipmap level.

Referring to FIG. 4A, a mipmap is embodied in 8 mipmap levels. The first bit 410 of the mipmap status register indicates an original texture (that is, level 0), the second bit 411 indicates level 1, the third bit 412 indicates level 2, the fourth bit 413 indicates level 3, the fifth bit 414 may indicate level 4, the sixth bit 415 may indicate level 5, the seventh bit 416 may indicate level 6, the eighth bit 417 may indicate level 7, and the ninth bit 418 may indicate level 8.

A mipmap generating unit according to an embodiment of the present invention may set the initial value, such that the initial mipmap status register indicates the existence of an original texture (level 0). In other words, the first bit 410 of the mipmap status register may indicate '1', whereas the remaining second through ninth bits 411 through 418 may indicate '0'. It may mean that only an original texture currently exists and mipmaps of levels 1 through 8 do not exist.

FIG. 4B shows a mipmap status register after a mipmap is generated, in accordance with an embodiment.

Referring to FIG. 4B, only a mipmap status register regarding a first texture is shown for convenience of explanation.

The mipmap generating unit, according to an embodiment, writes to a mipmap status register to indicate or notify of a generation of a mipmap.

For example, if a requested mipmap level is 3, the mipmap generating unit sequentially generates mipmaps of level 1, level 2, and level 3 from an original texture.

According to an embodiment, in the case of storing a mipmap of a requested mipmap level and all mipmaps that are previously sequentially generated, the mipmap generating unit writes '1' at the second through fourth bits. In this case, the first bit, which indicates the original texture, and the second through fourth bits, which respectively indicate levels 1 through 3, of the mipmap status register indicates '1', whereas the fourth through eighth bits, which respectively indicate levels 4 through 8, indicates '0'.

According to another embodiment, in response to only a mipmap of a requested mipmap level being written and mipmaps that are previously sequentially generated are not written, the mipmap generating unit writes '1' at the fourth bit of the mipmap status register. In this case, the first bit, which indicates the original texture, and the fourth bit, which indicates level 3, indicates '1', whereas the second, third, and fifth through ninth bits, which respectively indicate levels 1, 2, and 4 through 8, indicate '0'.

FIG. 5 is a flowchart of a method of generating a mipmap by estimating a mipmap level, according to another embodiment.

In operation 510, the method of a mipmap generating unit allocates a mipmap status register, which indicates whether a mipmap of a mipmap level regarding a corresponding texture exists, and a mipmap estimation register to estimate and store a requested mipmap level, with respect to the corresponding texture as a mipmap generating function is invoked.

According to an embodiment, the method of the mipmap generating unit allocates a mipmap status register, a mipmap estimation register, and a mipmap request register to record an actually requested mipmap level with respect to each of the textures in a frame.

In operation 520, the method of the mipmap generating unit starts a rendering operation.

In operation 530, the method of the mipmap generating unit determines whether an object uses a texture, with respect to which the generation of a mipmap is requested.

If the method determines that the object uses the texture corresponding to the request for mipmap generation, the method proceeds to operation 540. Otherwise, if the method determines that the object does not use the texture corresponding to the request for mipmap generation, the method proceeds to operation 545.

In operation 545, in response to the method determining that the object does not use the texture required mipmap generation, the method of the mipmap generating unit performs the rendering operation, without applying a mipmap technique.

In operation 540, in response to the method determining that the object uses the texture corresponding to the request for mipmap generation, the method of the mipmap generating unit estimates a mipmap level to be used.

According to an embodiment, the method of the mipmap generating unit writes an estimated mipmap level to the mipmap estimation register.

According to an embodiment, the method of the mipmap generating unit estimates a mipmap level per object. In this case, because calculation of an actually requested mipmap level is performed with respect to each of the pixels constituting an object, calculation of a mipmap level differs from estimation of a mipmap level.

According to an embodiment, when vertexes that passed vertex shading and primitives based on the same are set up and screen image coordinates are acquired, the mipmap generating unit and method thereof estimate a mipmap level based on the same. Regardless of an actual texture request, the mipmap generating unit and method thereof estimate the mipmap level based on screen image coordinates of various vertexes constituting each of the primitives and slopes on a Z-plane, texture coordinates, and a size of the texture in a setup operation after a draw call is received.

According to an embodiment, a mipmap generating unit generates a mipmap of an estimated mipmap level. Furthermore, the mipmap generating unit writes to a mipmap status register to indicate that the mipmap of the mipmap level is generated.

A method to estimate a mipmap level will be described below in detail with reference to FIG. 7.

In operation 550, the method of the mipmap generating unit requests a texture and calculates a mipmap level requested with respect to the texture.

Regardless of an estimated mipmap level, the method of the mipmap generating unit calculates a mipmap level to be used for an actual mapping.

The mipmap generating unit and method thereof, according to an embodiment, write a calculated mipmap level to a mipmap status register.

In operation 560, the method of the mipmap generating unit determines whether a mipmap of the calculated mipmap level exists.

According to an embodiment, the mipmap generating unit and method thereof determine whether a mipmap of the calculated mipmap level exists based on a mipmap status register.

As a result, in response to determining that a mipmap of the calculated mipmap level exists, operation 575 is performed. In response to determining that a mipmap of the calculated mipmap level does not exist, operation 570 is performed.

In operation 575, as it is determined that a mipmap of the calculated mipmap level exists, the method of the mipmap generating unit determines not to generate a mipmap of the calculated mipmap level and accesses the mipmap of the calculated mipmap level.

The method of the mipmap generating unit performs a rendering of a scene using the accessed mipmap for mapping.

In operation 570, in response to determining that a mipmap of the calculated mipmap level does not exist, the method of the mipmap generating unit generates a mipmap of the calculated mipmap level and instructs to reattempt a texture request.

In operation 580, the method of the mipmap generating unit generates a mipmap of the calculated mipmap level.

In operation 590, the method of the mipmap generating unit writes to a mipmap status register to indicate that the mipmap of the calculated mipmap level is generated.

Furthermore, the method of the mipmap generating unit receives a texture request again after a designated time period passes. In other words, operation 550 is performed again.

The mipmap generating unit and method thereof, according to an embodiment, determine whether a mipmap of a mipmap level calculated with respect to a texture exists based on a mipmap status register. As a result, because the mipmap of the calculated mipmap level is already generated in operation 580, the method of the mipmap generating unit determines that a mipmap of the calculated mipmap level exists. Based on a result of the determination, the method of the mipmap generating unit accesses a mipmap of the calculated mipmap level.

According to an embodiment, an estimated mipmap level is different from a calculated mipmap level to be actually used. However, a time period to generate a mipmap is hidden in a time period between the reception of a draw call and performance of pixel shading with respect to each primitives.

According to an embodiment, if the number of primitives is equal to or greater than a critical value, the method of the mipmap generating unit applies a general method to generate mipmaps with respect to all mipmap levels instead of a mipmap generation delaying method. The critical value is set to a particular value, in response to determining that, when the number of primitives is greater than the particular value, the application of a mipmap generation delaying method causes a significant load and becomes less efficient.

According to an embodiment, a mipmap generating unit does not apply a mipmap generation delaying method with respect to an object having complicated primitives and applies a general method to generate mipmaps with respect to all mipmap levels, based on a bounding box of the object. A complicated primitive may be defined as a primitive, with sufficient complexity, that an application of a mipmap generation delaying method causes a significant load and becomes less efficient than the application of the method in the related art.

Figure 6A:
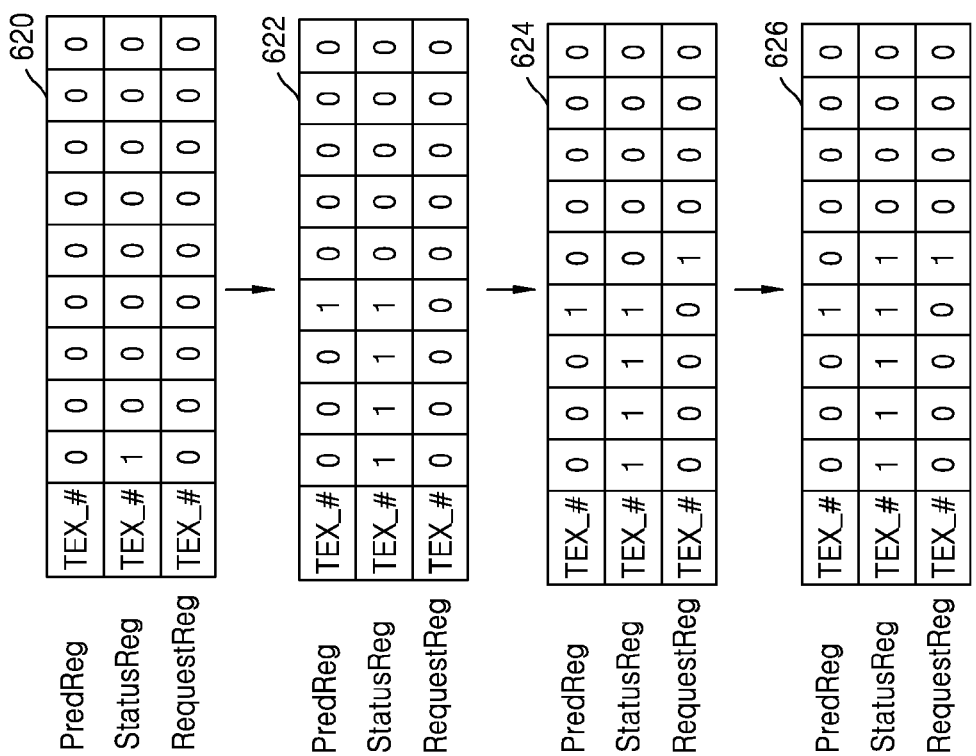
FIG. 6A through FIG. 6D are diagrams showing an example of a mipmap status register used in the method shown in FIG. 5.
Figure 6B:
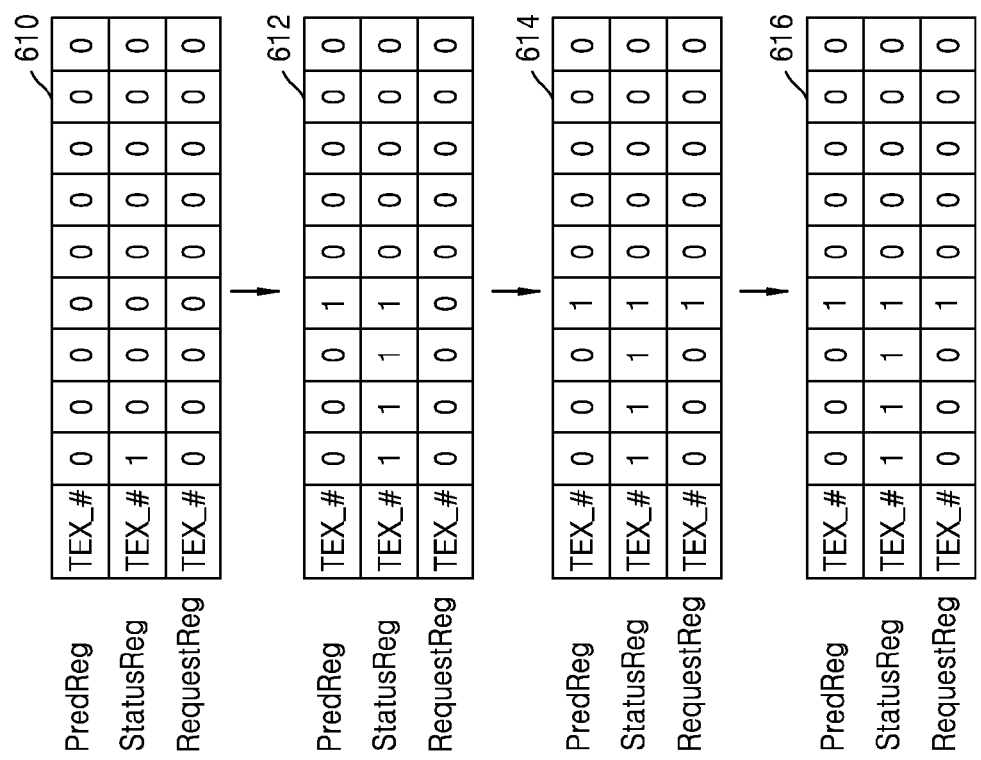

FIG. 6A and FIG. 6B are diagrams showing an example of a mipmap status register used in the method shown in FIG. 5, in accordance with an embodiment.

According to an embodiment, a mipmap generating unit allocates a mipmap status register StatusReg, a mipmap estimation register PredReg, and a mipmap request register RequestReg with respect to each of the textures in a frame. The mipmap status register includes a bit vector, which is a group of bits indicating respective mipmap levels thereof, based on an embodied mipmap level. In the same regard, the mipmap estimation register includes a bit vector, which is a group of bits indicating respective mipmap levels thereof, based on an embodied mipmap level. The mipmap request register also includes a bit vector, which is a group of bits indicating respective mipmap levels thereof, based on an embodied mipmap level.

Referring to FIG. 6A and FIG. 6B, a mipmap may be embodied in 8 mipmap levels, where a mipmap status register, a mipmap estimation register, and a mipmap request register regarding one texture are shown. A first bit of the mipmap status register indicates an original texture (that is, level 0), a second bit of the mipmap status register indicates level 1, and an $n^{th}$ bit of the mipmap status register is n. A first bit of the mipmap estimation register indicates an original texture (that is, level 0), a second bit of the mipmap estimation register indicates level 1, and an $n^{th}$ bit of the mipmap estimation register is n. A first bit of the mipmap request register indicates an original texture (that is, level 0), a second bit of the mipmap request register indicates level 1, and an $n^{th}$ bit of the mipmap request register is n.

FIG. 6A shows a case where an estimated mipmap level is identical to a calculated mipmap level, according to an embodiment.

The reference numeral 610 denotes a mipmap status register, a mipmap estimation register, and a mipmap request register that are initially allocated.

A mipmap generating unit, according to an embodiment, sets the initial value of the initial mipmap status register to indicate that an original texture (level 0) exists. For example, the first bit of the mipmap status register is '1', whereas the other second through ninth bits of the mipmap status register is '0'. In this example, the first bit of the mipmap status register and the second through ninth bits of the mipmap status register mean that only an original texture currently exists and mipmaps of levels 1 through 8 do not exist.

The reference numeral 612 denotes a mipmap status register, a mipmap estimation register, and a mipmap request register after a mipmap level is estimated and a mipmap of the estimated mipmap level is generated.

A mipmap generating unit, according to an embodiment, writes to a mipmap status register to indicate that a mipmap is generated.

For example, in response to an estimated mipmap level being 3, the mipmap generating unit sequentially generates mipmaps of level 1, level 2, and level 3 from an original texture. According to an embodiment, in the case of storing a mipmap of a requested mipmap level and all mipmaps that are previously sequentially generated, the mipmap generating unit writes '1' at the second through fourth bits. In this example, the first bit, which indicates the original texture, and the second through fourth bits, which respectively indicate levels 1 through 3, of the mipmap status register indicate '1', whereas the fourth through eighth bits, which respectively indicate levels 4 through 8, indicate '0'.

The reference numeral 614 denotes a mipmap status register, a mipmap estimation register, and a mipmap request register after an actually requested mipmap level is calculated.

For example, if an actually requested mipmap level is calculated as a level 3, '1' is written at a fourth bit of the mipmap status register, which indicates level 3.

The reference numeral 616 is a mipmap status register, a mipmap estimation register, and a mipmap request register after it is determined whether a mipmap of the calculated mipmap level exists.

If a calculated mipmap level is identical to an estimated mipmap level, that is, a mipmap of the calculated mipmap level already exists, a mipmap generating unit accesses and uses the existing mipmap without generating a new mipmap. Therefore, a mipmap status register, a mipmap estimation register, and a mipmap request register are not changed from those denoted by the reference numeral 614.

FIG. 6B shows a case where an estimated mipmap level is different from a calculated mipmap level, according to an embodiment.

Hereinafter, descriptions already given above with reference to FIG. 6A are incorporated herein.

The reference numeral 620 is a mipmap status register, a mipmap estimation register, and a mipmap request register that are initially allocated.

The reference numeral 622 is a mipmap status register, a mipmap estimation register, and a mipmap request register after a mipmap level is estimated and a mipmap of the estimated mipmap level is generated.

The reference numeral 624 is a mipmap status register, a mipmap estimation register, and a mipmap request register after an actually requested mipmap level is calculated.

For example, if an actually requested mipmap level is calculated as a level 4, '1' is written at a fifth bit of the mipmap status register, which indicates level 4.

The reference numeral 626 denotes a mipmap status register, a mipmap estimation register, and a mipmap request register after it is determined whether a mipmap of the calculated mipmap level exists.

If a calculated mipmap level is different from an estimated mipmap level, that is, a mipmap of the calculated mipmap level does not exist, a mipmap generating unit may generate a mipmap of the calculated mipmap level. The mipmap generating unit may write to a mipmap status register to indicate that a mipmap of the calculated mipmap level is generated. The mipmap generating unit may write '1' at a fifth bit of the mipmap status register, which indicates level 4.

Figure 6C:
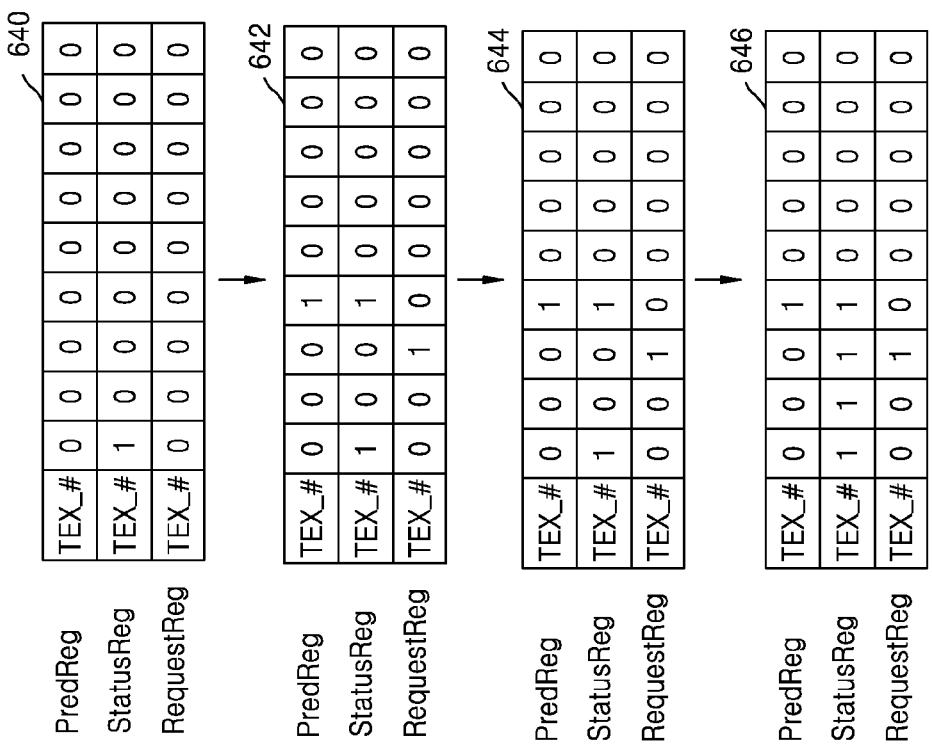

FIG. 6C shows a case where an estimated mipmap level is different from a calculated mipmap level and all sequentially generated mipmaps are written, in accordance with an embodiment.

Hereinafter, descriptions already given above with reference to FIG. 6A will be omitted.

The reference numeral 630 is a mipmap status register, a mipmap estimation register, and a mipmap request register that are initially allocated.

The reference numeral 632 is a mipmap status register, a mipmap estimation register, and a mipmap request register after a mipmap level is estimated and a mipmap of the estimated mipmap level is generated.

The reference numeral 634 is a mipmap status register, a mipmap estimation register, and a mipmap request register after an actually requested mipmap level is calculated.

For example, if an actually requested mipmap level is calculated as a level 1, '1' is written at a second bit of the mipmap status register, which indicates level 1.

The reference numeral 636 is a mipmap status register, a mipmap estimation register, and a mipmap request register after it is determined whether a mipmap of the calculated mipmap level exists.

Referring to FIG. 6C, a calculated mipmap level is different from an estimated mipmap level. However, when a mipmap generating unit generates a mipmap of the estimated mipmap level, mipmaps of level 1, level 2, and level 2 from an original texture are sequentially generated and written. As a result, a mipmap of the estimated mipmap level, that is, a mipmap of level 2 exists. Although the calculated mipmap level is not identical to the estimated mipmap level, a mipmap of the calculated mipmap level already exists and; thus, the mipmap generating unit accesses and uses the existing mipmap without generating a new mipmap. Therefore, a mipmap status register, a mipmap estimation register, and a mipmap request register are not changed from those denoted by the reference numeral 634.

Figure 6D:
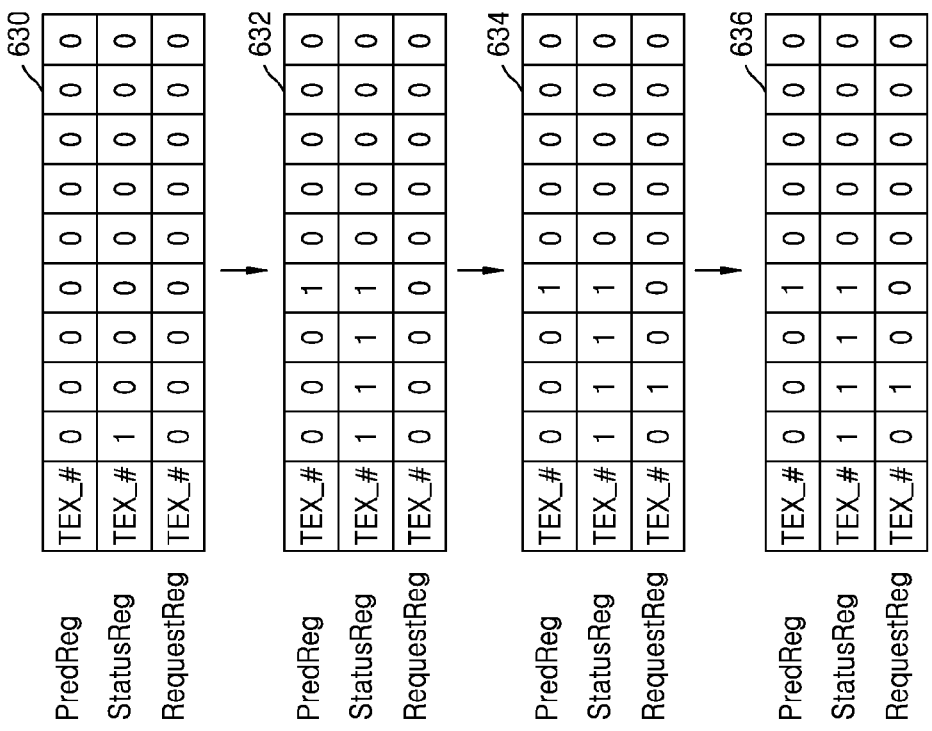

FIG. 6D shows a case where an estimated mipmap level is different from a calculated mipmap level and only a mipmap of the estimated mipmap level is written, in accordance with an embodiment.

Hereinafter, descriptions already given above with reference to FIG. 6A are incorporated herein.

The reference numeral 640 is a mipmap status register, a mipmap estimation register, and a mipmap request register that are initially allocated.

The reference numeral 642 is a mipmap status register, a mipmap estimation register, and a mipmap request register after a mipmap level is estimated and a mipmap of the estimated mipmap level is generated.

Referring to FIG. 6D, in this example, a mipmap generating unit writes only a mipmap of an estimated mipmap level. For instance, if an estimated mipmap level is 3, the mipmap generating unit sequentially generates mipmaps of level 1, level 2, and level 3 from an original texture, but only writes the mipmap of level 3. According to an embodiment, in the case of storing only a mipmap of an estimated mipmap level, the mipmap generating unit writes '1' at a fourth bit. In this case, a first bit, which indicates an original texture, and the fourth bit, which indicates level 3, of the mipmap status register may indicate '1', whereas remaining bits respectively indicating levels 1, 2, and 4 through 8 may indicate '0'.

The reference numeral 644 is a mipmap status register, a mipmap estimation register, and a mipmap request register after an actually requested mipmap level is calculated.

For example, if an actually requested mipmap level is calculated as a level 2, '1' is written at a third bit of the mipmap status register, which indicates level 2.

The reference numeral 646 is a mipmap status register, a mipmap estimation register, and a mipmap request register after determining whether a mipmap of the calculated mipmap level exists.

If a calculated mipmap level is different from an estimated mipmap level, that is, a mipmap of the calculated mipmap level does not exist, a mipmap generating unit generates a mipmap of the calculated mipmap level. The mipmap generating unit writes to a mipmap status register to indicate that a mipmap of the calculated mipmap level is generated. The mipmap generating unit writes '1' at a third bit of the mipmap status register, which indicates level 2.

FIG. 7 is a flowchart of a method of estimating a mipmap level, according to another embodiment.

In operation 710, the method of a mipmap generating unit obtains coordinates of vertexes constituting a primitive to use a texture.

In operation 720, the method of the mipmap generating unit estimates a mipmap level based on the vertexes constituting the primitive to use a texture.

The mipmap generating unit, according to an embodiment, obtains coordinates of the vertexes constituting the primitive to use a texture and calculates a size and Z-plane slope of the primitive based on the obtained coordinates of the vertexes. The mipmap generating unit estimates a mipmap level based on the size of the primitive, the Z-plane slope of the primitive, coordinates of a texture, and a size of the texture.

In operation 730, the method of the mipmap generating unit determines whether to apply tolerance to the estimation of a mipmap level.

For example, the mipmap generating unit determines whether to apply tolerance to the estimation of a mipmap level based on a user input.

If the method determines that tolerance is to be applied, operation 740 is performed. Otherwise, if the method determines that tolerance is not to be applied, operation 745 is performed.

In operation 740, as tolerance is applied, the method of the mipmap generating unit generates a mipmap of a level within a tolerance range from an estimated mipmap level.

In operation 750, the method of the mipmap generating unit adjusts tolerance based on whether an estimated mipmap level is identical to a calculated mipmap level.

In operation 760, in response to the estimated mipmap level being identical to a calculated mipmap level, the method of the mipmap generating unit narrows the tolerance range.

In operation 765, in response to the estimated mipmap level is not identical to a calculated mipmap level, the method of the mipmap generating unit widens the tolerance range.

Detailed descriptions of the adjustment of tolerance will be given below with reference to FIGS. 8A and 8B.

In operation 745, by not applying tolerance, the method of the mipmap generating unit generates a mipmap only of an estimate mipmap level.

Figure 8A:
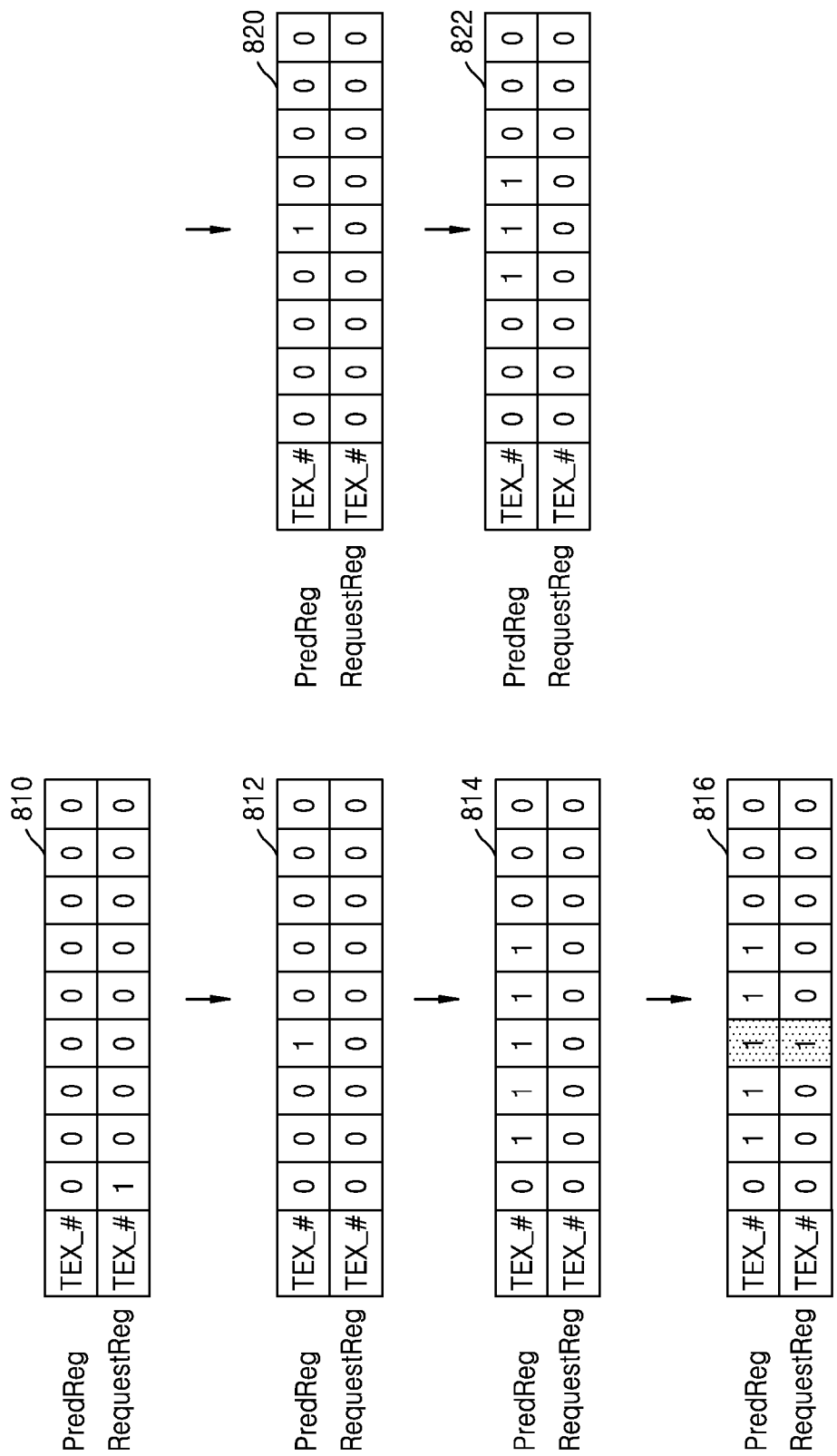
FIGS. 8A and 8B are diagrams for describing adjustment of tolerance during estimation of the mipmap level, according to another embodiment.
Figure 8B:
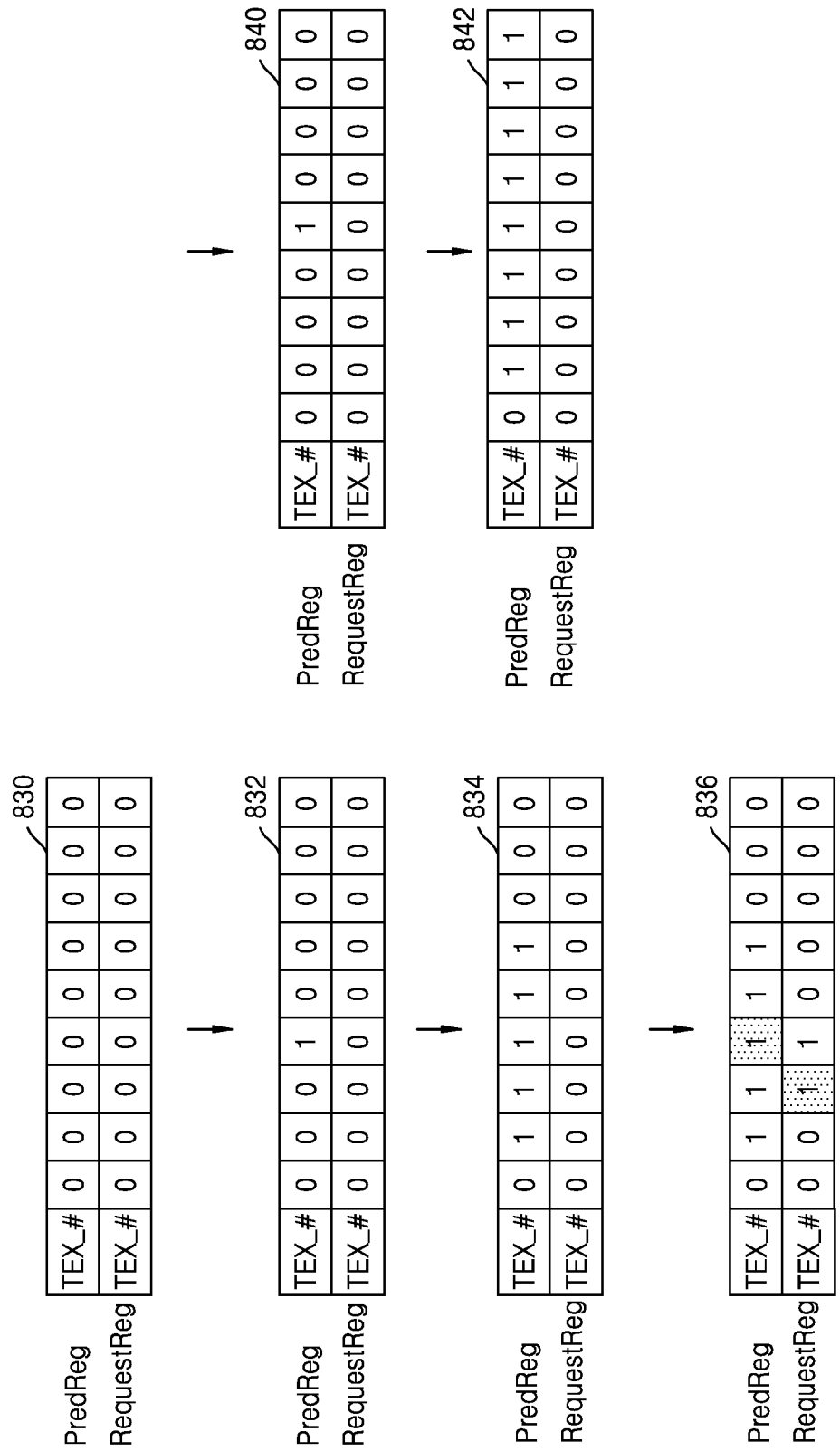

FIGS. 8A and 8B are diagrams describing adjustment of tolerance during estimation of a mipmap level, according to another embodiment.

According to an embodiment, tolerance is adjusted based on whether an estimated mipmap level is identical to a calculated mipmap level.

FIG. 8A is a diagram describing adjustment of tolerance in the case where an estimated mipmap level is identical to a calculated mipmap level.

According to an embodiment, in response to an estimated mipmap level being identical to a calculated mipmap level, a mipmap generating unit narrows the tolerance range.

The reference numeral 810 is a mipmap estimation register and a mipmap request register that are initially allocated.

The reference numeral 812 is a case where an estimated mipmap level is 3. In other words, a fourth bit indicating level 3 indicates '1'.

The reference numeral 814 indicates that tolerance is applied to the estimation of a mipmap level.

According to an embodiment, a mipmap generating unit writes '1' to a bit of the mipmap estimation register indicating mipmap levels within the tolerance range from an estimated mipmap level and generates a mipmap with respect to a mipmap level within the tolerance range from the estimated mipmap level.

For example, if the estimated mipmap level is 3 and tolerance is 2, '1' is written in second through sixth bits respective indicating level 1 through level 5 and mipmaps are generated with respect to mipmap levels 1 through 5.

In other words, the tolerance range is calculated according to <Equation 1>.

$$\text{Pred\_Mip\_Level} - t \leq \text{Gen\_Mip} \leq \text{Pred\_Mip\_Level} + t \quad \text{<Equation 1>}$$

In Equation 1, Pred_Mip_Level denotes tolerance, whereas Gen_Mip denotes a mipmap level within the tolerance range.

According to an embodiment, the initial tolerance is set in advance. For example, a mipmap generating unit determines the initial tolerance based on a user input. As another example, the initial tolerance is determined according to <Equation 2>.

$$t = NUM\_MIP\_LEVEL/2 \quad \text{<Equation 2>}$$

Here, t denotes tolerance, whereas NUM_MIP_LEVEL denotes an embodied mipmap level.

The reference numeral 816 indicates determining whether an estimated mipmap level is identical to a calculated mipmap level.

A mipmap generating unit compares an estimated mipmap level PredReg to a calculated mipmap level RequestReg, which is an actually requested mipmap level. In one illustrative example, the mipmap generating unit determines that the estimated mipmap level is identical to the calculated mipmap level only if the estimated mipmap level is exactly identical to the calculated mipmap level.

For example, if "AND((PredReg, RequestReg)" is not 0, that is, at least one of the mipmap levels within the tolerance range of an estimated mipmap level is identical to a calculated mipmap level, the mipmap generating unit determines that the estimated mipmap level is identical to the calculated mipmap level.

As it is determined that the estimated mipmap level is identical to the calculated mipmap level, the mipmap generating unit reduces tolerance. For example, if the initial tolerance is 2, the mipmap generating unit reduces tolerance to 1.

According to an embodiment, the mipmap generating unit reduces tolerance differently in the case where an estimated mipmap level is exactly identical to a calculated mipmap level and in the case where, although an estimated mipmap level is not exactly identical to a calculated mipmap level, at least one of the mipmap levels within the tolerance range of an estimated mipmap level is identical to the calculated mipmap level.

For example, if an estimated mipmap level is exactly identical to a calculated mipmap level, the mipmap generating unit reduces tolerance by 2. Furthermore, if, although an estimated mipmap level is not exactly identical to a calculated mipmap level, at least one of the mipmap levels within the tolerance range of an estimated mipmap level is identical to the calculated mipmap level, the mipmap generating unit reduces tolerance by 1.

In an embodiment, the mipmap generating unit reduces tolerance by 1 only if an estimated mipmap level is exactly identical to a calculated mipmap level.

The reference numeral 820 indicates a case where a mipmap generating unit newly estimates a mipmap level. For example, an estimated mipmap level is level 4.

The reference numeral 822 indicates that a new tolerance is applied to the estimation of a mipmap level.

According to an embodiment, a mipmap generating unit writes '1' to a bit vector of a mipmap estimation register indicating a mipmap level within the tolerance range from an estimated mipmap level. The writing is done based on an estimated mipmap level. The mipmap generating unit also generates a mipmap with respect to a mipmap level within the tolerance range from the estimated mipmap level.

For example, in response to the estimated mipmap level being 4 and tolerance being 1, '1' is written in fourth through sixth bits respectively indicating level 3 through level 5 and mipmaps are generated with respect to the mipmap levels 3 through 5.

According to an embodiment, if tolerance is 0, the mipmap generating unit may no longer reduce tolerance, even if an estimated mipmap level is exactly identical to a calculated mipmap level.

FIG. 8B is a diagram describing adjustment of tolerance in the case where an estimated mipmap level is not identical to a calculated mipmap level, in accordance with an embodiment.

Descriptions provided above with reference to FIG. 8A are incorporated herein.

According to an embodiment, in response to the estimated mipmap level not being identical to a calculated mipmap level, a mipmap generating unit widens the tolerance range.

The reference numeral 830 denotes a mipmap estimation register and a mipmap request register that are initially allocated.

The reference numeral 832 indicates a case where an estimated mipmap level is 3. In other words, a fourth bit indicating level 3 indicates '1'.

The reference numeral 834 indicates that tolerance is applied to the estimation of a mipmap level.

For example, if the estimated mipmap level is 3 and tolerance is 2, mipmaps are generated with respect to mipmap levels 1 through 5, and '1' is written in second through sixth bits respective indicating level 1 through level 5.

The reference numeral 836 indicates a determination of whether the estimated mipmap level is identical to a calculated mipmap level.

The mipmap generating unit compares an estimated mipmap level PredReg to a calculated mipmap level RequestReg, which is an actually requested mipmap level. For example, the mipmap generating unit determines that the estimated mipmap level is identical to the calculated mipmap level only if the estimated mipmap level is exactly identical to the calculated mipmap level.

For example, if "AND((PredReg, RequestReg)" is not 0, that is, at least one of the mipmap levels within the tolerance range of an estimated mipmap level is identical to a calculated mipmap level, the mipmap generating unit determines that the estimated mipmap level is identical to the calculated mipmap level.

As it is determined that the estimated mipmap level is not identical to the calculated mipmap level, the mipmap generating unit increases tolerance. For example, if the initial tolerance is 2, the mipmap generating unit increases tolerance to 4.

According to an embodiment, the mipmap generating unit increases tolerance differently in the case where, although an estimated mipmap level is not exactly identical to a calculated mipmap level, at least one of the mipmap levels, within the tolerance range of an estimated mipmap level, is identical to the calculated mipmap level. Also, the mipmap generating unit increases tolerance differently in the case where an estimated mipmap level is not exactly identical to any of the mipmap levels within the tolerance range from the estimated mipmap level.

For example, if, although an estimated mipmap level is not exactly identical to a calculated mipmap level, at least one of the mipmap levels within the tolerance range of an estimated mipmap level is identical to the calculated mipmap level, the mipmap generating unit increases tolerance by 1. Furthermore, if an estimated mipmap level is not exactly identical to any of the mipmap levels within the tolerance range from the estimated mipmap level, the mipmap generating unit increases tolerance by 2.

In the current embodiment, the mipmap generating unit increases tolerance by 2 only if an estimated mipmap level is not exactly identical to a calculated mipmap level.

The reference numeral 840 indicates a case where a mipmap generating unit newly estimates a mipmap level. For example, an estimated mipmap level is level 4.

The reference numeral 842 indicates that a new tolerance is applied to the estimation of a mipmap level.

According to an embodiment, a mipmap generating unit generates mipmaps with respect to mipmap levels within the tolerance range from an estimated mipmap level and writes '1' to a bit vector of a mipmap estimation register indicating a corresponding mipmap level.

For example, if the estimated mipmap level is 4 and tolerance is 4, mipmaps are generated with respect to mipmap levels 0 through 8, and '1' is written in first through eighth bits, respectively, indicating level 1 through level 8.

According to an embodiment, if tolerance is identical to a value calculated according to <Equation 2>, the mipmap generating unit does not increase tolerance any further, even if an estimated mipmap level is not identical to a calculated mipmap level.

According to an embodiment, a mipmap generating unit differentiates an increasing size and a reducing size of the tolerance from each other. Furthermore, the mipmap generating unit variably increases and reduces tolerance based on a difference between an estimated mipmap level and a calculated mipmap level. Furthermore, the mipmap generating unit uses a history of using a texture with respect to another object or another frame to adjust tolerance.

According to an embodiment, a mipmap generating unit selectively applies tolerance. If tolerance is not applied, then t=0. For example, the mipmap generating unit determines whether to apply tolerance based on a user input.

Figure 9:
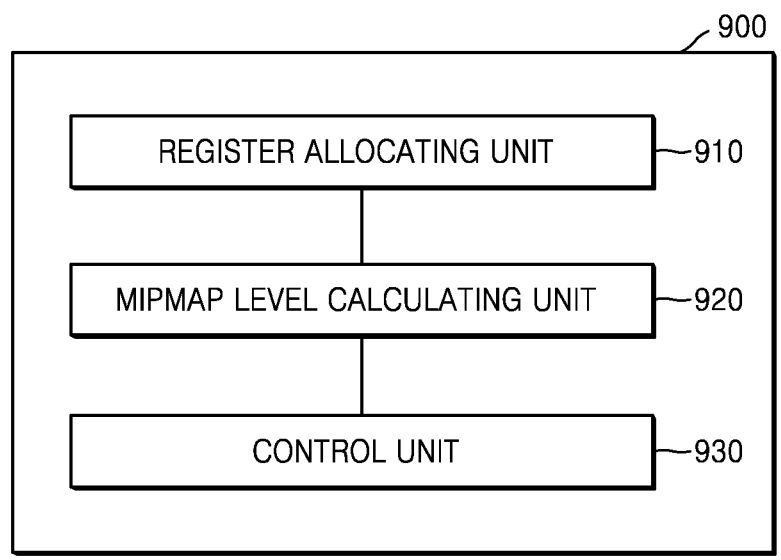
FIG. 9 is a block diagram of a structure of a mipmap generating unit, according to an embodiment.

FIG. 9 is a block diagram of structure of the mipmap generating unit as described above with respect to FIGS. 1A to 8B, according to an embodiment.

As shown in FIG. 9, a mipmap generating unit 900 includes a register allocating unit 910, a mipmap level calculating unit 920, and a control unit 930. However, the mipmap generating unit 900 may be embodied with more or less of the structural units or structural components shown in FIG. 9.

The register allocating unit 910 allocates mipmap status registers indicating mipmap levels generated with respect to a texture as a mipmap generating function is invoked.

The register allocating unit 910, according to an embodiment, allocates a mipmap estimation register to estimate and store a requested mipmap level with respect to a texture. Furthermore, the register allocating unit 910 allocates a mipmap request register to store an actually requested mipmap level with respect to the texture.

The mipmap level calculating unit 920 receives a request regarding the texture and calculates a mipmap level requested with respect to the texture.

The control unit 930 determines whether a mipmap of a calculated mipmap level exists by using a mipmap status register. Also, based on a result of the determination, the control unit 930 determines whether to generate a mipmap of the calculated mipmap level.

If it is determined that a mipmap of the calculated mipmap level exists, the control unit 930, according to an embodiment, determines not to generate a mipmap of the calculated mipmap level and access a mipmap of the calculated mipmap level.

Otherwise, if the control unit 930 determines that a mipmap of the calculated mipmap level does not exist, the control unit 930, according to an embodiment, determines to generate a mipmap of the calculated mipmap level, to generate a mipmap of the calculated mipmap level, and to write to mipmap status register to indicate that the mipmap of the calculated mipmap level is generated. Furthermore, the control unit 930 instructs to reattempt a texture request and processes another texture request until current request is reattempted.

The control unit 930 estimates a mipmap level and records an estimated mipmap level in a mipmap status register. Furthermore, the control unit 930 generates a mipmap of the estimated mipmap level and writes to a mipmap status register to indicate that the mipmap of the estimated mipmap level is generated.

For example, the control unit 930 estimates a mipmap level based on vertexes constituting a primitive to use a texture. In detail, the control unit 930 obtains coordinates of the vertexes constituting the primitive and calculates a size and a slope on a Z-plane of the primitive. The control unit 930 estimates a mipmap level based on size of the primitive, the Z-plane slope of the primitive, coordinates of a texture, and the size of the texture.

As tolerance is applied to the estimation of a mipmap level, the control unit 930, according to another embodiment, writes mipmap levels within the tolerance range from an estimated mipmap level in a mipmap estimation register. The control unit 930 generates mipmaps of mipmap levels within the tolerance range from an estimated mipmap level and writes to a mipmap estimation register that mipmaps are generated of mipmap levels, within the tolerance range from the estimated mipmap level. Furthermore, the control unit 930 writes the calculated mipmap level in a mipmap request register.

Tolerance is adjusted based on whether an estimated mipmap level is identical to a calculated mipmap level. For example, the control unit 930 determines whether an estimated mipmap level is identical to a calculated mipmap level by using a mipmap estimation register and a mipmap request register. If the control unit 930 determines that the estimated mipmap level is identical to the calculated mipmap level, the control unit 930 reduces tolerance. Otherwise, if the control unit 930 determines that the estimated mipmap level is not identical to the calculated mipmap level, the control unit 930 may increase tolerance.

When a mipmap generating call is generated by a running application program, the mipmap generating unit 900, according to an embodiment, returns the call without processing the call immediately, estimates a mipmap level when the time at which a mipmap is to be actually used, and prepares the mipmap at or before the time.

According to an embodiment, the mipmap generating unit 900 may include separate hardware (not shown) to generate a mipmap. If the separate hardware is not employed, mipmap generation is performed through a device driver (not shown) of a host processor.

The units described herein may be implemented using hardware components. For example, calculators, controllers, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIGS. 2-3, 5, and 7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the methods described in FIGS. 2-3, 5, and 7.

Program instructions to perform the methods described in FIGS. 2-3, 5, and 7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a mipmap, comprising:
    allocating a mipmap status register of a mipmap level generated with respect to a texture as a mipmap generating function is invoked, without generating the mipmap;
    receiving an initial request for the texture and calculating a mipmap level with respect to the texture;
    determining whether a mipmap of the calculated mipmap level exists in response to the initial request using the mipmap status register and outputting a result indicative thereof;
    if the mipmap of the calculated mipmap level does not exist, receiving a subsequent request for the texture at a later time than the initial request, wherein the subsequent request for the texture is received after generation of the mipmap is delayed for a predetermined time period;
    determining whether to generate the mipmap of the calculated mipmap level based on the subsequent request at the end of the predetermined time period; and
    if the mipmap of the calculated mipmap level does not exist at the end of the predetermined time period, generating the mipmap of the calculated mipmap level.

2. The method of claim 1, wherein the determining of whether the mipmap of the calculated mipmap level exists comprises
    determining not to generate a mipmap of the calculated mipmap level, upon determining that the mipmap of the calculated mipmap level exists in response to the subsequent inquiry, and
    accessing the existing mipmap of the calculated mipmap level.

3. The method of claim 1, wherein the generating the mipmap of the calculated mipmap level comprises
    writing to the mipmap status register to indicate that the mipmap of the mipmap level is generated.

4. The method of claim 1, wherein the allocating of the mipmap status register comprises
    allocating the mipmap estimation register to estimate and write a requested mipmap level for the texture,
    estimating the mipmap level,
    writing the estimated mipmap level to the mipmap estimation register,
    generating the mipmap of the estimated mipmap level, and
    writing to the mipmap status register to indicate that the mipmap of the mipmap level is generated.

5. The method of claim 4, wherein the determining of whether the mipmap of the calculated mipmap level exists comprises
    in response to determining that the mipmap of the calculated mipmap level exists, determining not to generate the mipmap of the calculated mipmap level, and
    accessing the mipmap of the calculated mipmap level.

6. The method of claim 4, wherein the determining of whether the mipmap of the calculated mipmap level exists comprises
    in response to determining that the mipmap of the calculated mipmap level does not exist, generating the mipmap of the calculated mipmap level, and
    writing to the mipmap status register to indicate that the mipmap of the mipmap level is generated.

7. The method of claim 6, wherein the determining to generate a mipmap of the calculated mipmap level comprises
    instructing to request the texture again, and
    processing another texture request when the texture request is made again.

8. The method of claim 4, wherein the estimating of the mipmap level comprises estimating the mipmap level based on vertexes comprising a primitive to use the texture.

9. The method of claim 8, wherein the estimating of the mipmap level comprises:
    obtaining coordinates of vertexes comprising the primitive,
    calculating a size of the primitive and a slope on a Z-plane of the primitive based on the coordinates of the vertexes, and
    estimating the mipmap level based on the size of the primitive, the slope on the Z-plane of the primitive, coordinates of the texture, and the size of the texture.

10. A method of generating a mipmap, comprising
    allocating a mipmap status register of a mipmap level generated with respect to a texture as a mipmap generating function is invoked, without generating the mipmap;
    receiving a request for the texture and calculating a mipmap level with respect to the texture;

determining whether a mipmap of the calculated mipmap level exists using the mipmap status register and outputting a result indicative thereof;

determining whether to generate the mipmap of the calculated mipmap level based on the result; and generating the mipmap of the calculated mipmap level after the request for the texture is received, upon determining that the mipmap of the calculated mipmap level does not exist, wherein the allocating of the mipmap status register comprises:

allocating the mipmap estimation register to estimate and write a requested mipmap level for the texture, estimating the mipmap level, writing the estimated mipmap level to the mipmap estimation register, generating the mipmap of the estimated mipmap level, and writing to the mipmap status register to indicate that the mipmap of the mipmap level is generated, wherein the allocating of the mipmap status register further comprises allocating a mipmap request register to write an actually requested mipmap level with respect to the texture, wherein the writing of the estimated mipmap level to the mipmap estimation register comprises writing mipmap levels within a tolerance range of the estimated mipmap level to the mipmap estimation register, wherein the generating of the mipmap of the estimated mipmap level is performed within the tolerance range of the estimated mipmap level, wherein the writing of the mipmap status register to indicate that the mipmap of the mipmap level is generated comprises writing the mipmap status register to indicate that mipmaps of the mipmap levels within the tolerance range from the estimated mipmap level are generated, and wherein the calculating the mipmap level further comprises writing the calculated mipmap level to the mipmap request register.

11. The method of claim 10, wherein the tolerance is adjusted based on whether the estimated mipmap level is identical to the calculated mipmap level.

12. The method of claim 10, further comprising:

determining whether the estimated mipmap level is identical to the calculated mipmap level using the mipmap estimation register and the mipmap request register; and reducing the tolerance in response to determining that the estimated mipmap level is identical to the calculated mipmap level.

13. The method of claim 10, further comprising:

determining whether the estimated mipmap level is identical to the calculated mipmap level using the mipmap estimation register and the mipmap request register; and increasing the tolerance in response to determining that the estimated mipmap level is not identical to the calculated mipmap level.

14. A computer program embodied on a non-transitory computer readable medium, the computer program being configured to control a processor to perform allocating a mipmap status register of a mipmap level generated with respect to a texture as a mipmap generating function is invoked, without generating the mipmap;

receiving a first request for the texture and calculating a mipmap level with respect to the texture;

determining whether a mipmap of the mipmap level exists using the mipmap status register in response to the first request;

if the mipmap of the calculated mipmap level does not exist, delaying generation of the mipmap for a predetermined time period;

receiving a second request for the texture and calculating the mipmap level again in response to the second request;

determining whether to generate the mipmap of the calculated mipmap level based on the second request; and generating the mipmap of the calculated mipmap level after the second request for the texture is received, upon determining that the mipmap of the calculated mipmap level does not exist.

15. A mipmap generating device, comprising:

a register allocating unit configured to allocate a mipmap status register indicating a mipmap level generated with respect to a texture as a mipmap generating function is invoked, without generating the mipmap;

a mipmap level calculating unit configured to receive an initial request regarding the texture and calculate a mipmap level requested with respect to the texture, without generating the mipmap in response to the initial request; and a control unit configured to determine whether a mipmap of the calculated mipmap level exists using the mipmap status register in response to the initial request and to delay generation of the mipmap if the mipmap does not exist, determine whether to generate a mipmap of the calculated mipmap level in response to a subsequent request received by the mipmap level calculating unit based on whether the mipmap of the mipmap level exists, and if the mipmap level still does not exist at the time of the subsequent request to generate the mipmap of the calculated mipmap level.

16. The mipmap generating device of claim 15, wherein the control unit determines not to generate a mipmap of the calculated mipmap level upon determining that a mipmap of the calculated mipmap level exists, and accesses the existing mipmap of the calculated mipmap level.

17. The mipmap generating device of claim 15, wherein the control unit generates a mipmap of the calculated mipmap level and writes to the mipmap status register to indicate that the mipmap of the mipmap level is generated.

18. The mipmap generating device of claim 15, wherein the register allocating unit allocates a mipmap estimation register to estimate and write a requested mipmap level for the texture, and the control unit estimates the mipmap level, writes the estimated mipmap level to the mipmap estimation register, generates the mipmap of the estimated mipmap level, and writes to the mipmap status register to indicate that the mipmap of the mipmap level is generated.

19. A mipmap generating device, comprising:

a register allocating unit configured to allocate a mipmap status register indicating a mipmap level generated with respect to a texture as a mipmap generating function is invoked, without generating the mipmap;

a mipmap level calculating unit configured to receive a request regarding the texture and calculates a mipmap level requested with respect to the texture; and a control unit configured to determine whether a mipmap of the calculated mipmap level exists using the mipmap status register, determine whether to generate a mipmap of the calculated mipmap level based on whether the mipmap of the mipmap level exists, and generate the mipmap of the calculated mipmap level after the request for the texture is received, upon determining that the mipmap of the calculated mipmap level does not exist, wherein the register allocating unit allocates a mipmap estimation register to estimate and write a requested mipmap level for the texture, and the control unit estimates the mipmap level, writes the estimated mipmap level to the mipmap estimation register, generates the mipmap of the estimated mipmap level, and writes to the mipmap status register to indicate that the mipmap of the mipmap level is generated, wherein the register allocating unit allocates a mipmap request register to write the requested mipmap level with respect to the texture, and the control unit writes mipmap levels within a tolerance range from the estimated mipmap level in the mipmap estimation register, generates mipmap of the mipmap levels within the tolerance range from the estimated mipmap level, writes to the mipmap status register to indicate that mipmaps of the mipmap levels within the tolerance range from the estimated mipmap level are generated, and writes the calculated mipmap level to the mipmap request register.

* * * * *